May 31, 1927.  1,630,376
J. DERRY
TENSION MECHANISM
Filed Oct. 20, 1924
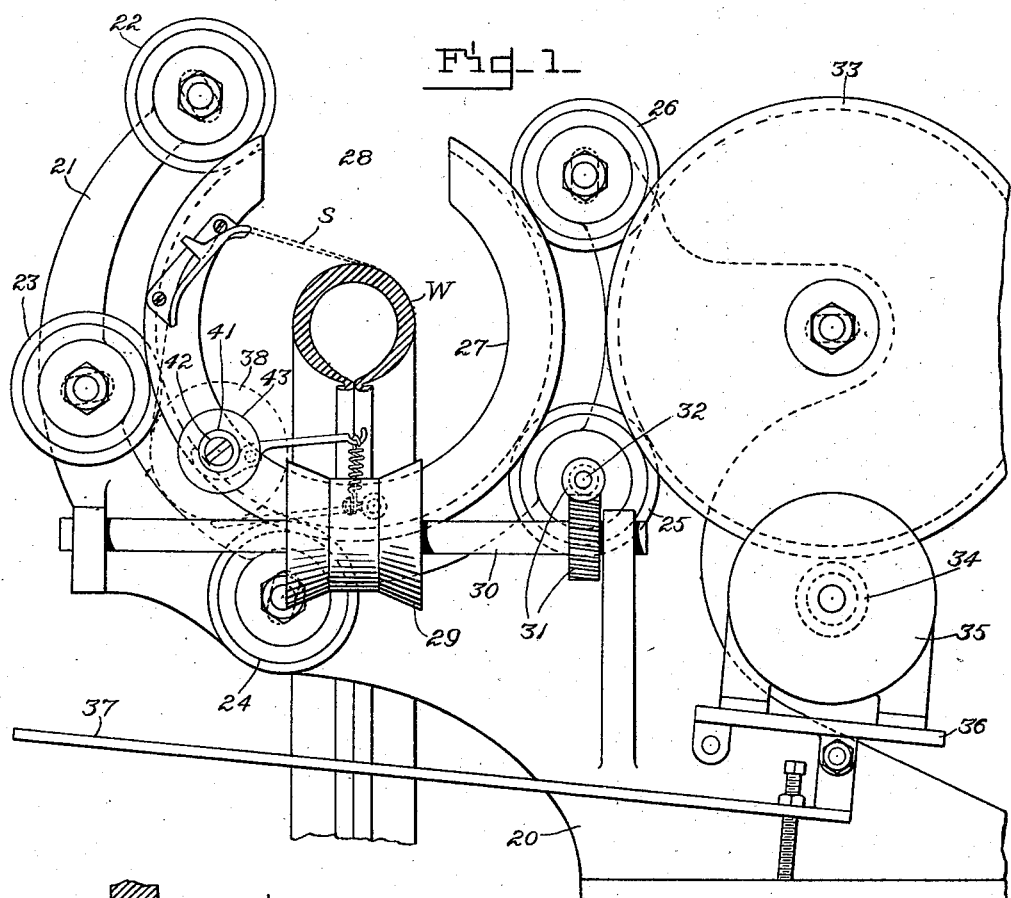
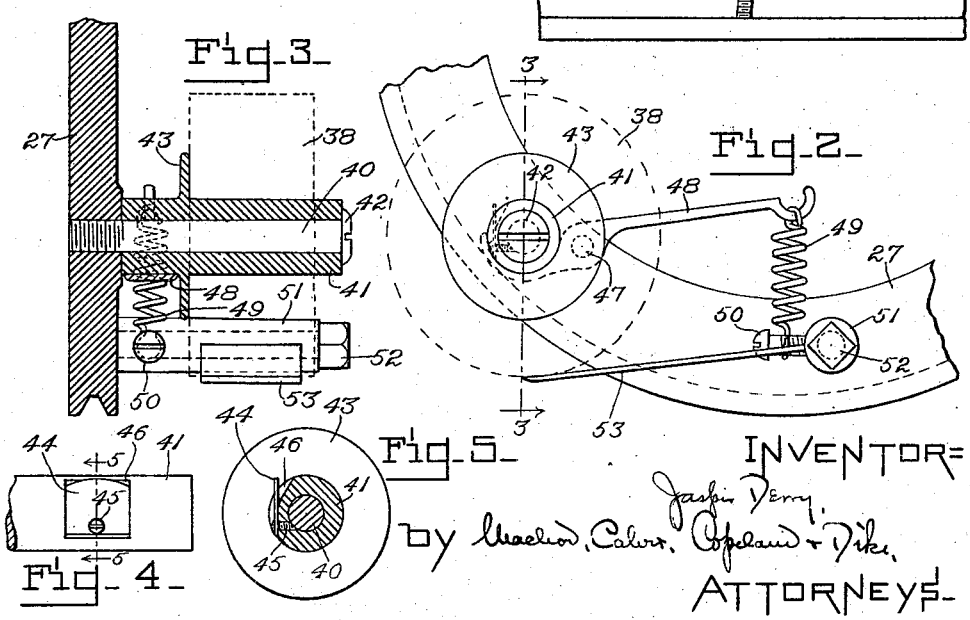
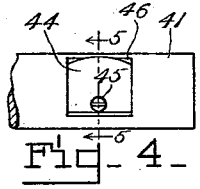
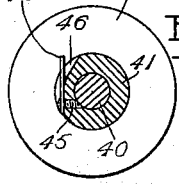
INVENTOR
Jasper Derry
By MacLeod, Calver, Copeland & Dike
ATTORNEYS Patented May 31, 1927.

1,630,376

UNITED STATES PATENT OFFICE.

JASPER DERRY, OF MEDFORD, MASSACHUSETTS, ASSIGNOR TO ANDREW TERKELSEN, OF BOSTON, MASSACHUSETTS.

TENSION MECHANISM.

Application filed October 20, 1924. Serial No. 744,860.

This invention relates to mechanism for applying tension to a strip or web of flexible material drawn from a roll or reel, and has for its object to provide simplified but effective mechanism for applying, substantially at or adjacent the center of the roll, a braking force resisting the free rotation of the latter and automatically proportioned to the diameter of the roll, so that the strip, which is drawn from the periphery of the roll, will be subjected to a constant tension. To this end the invention comprises a simple form of compound lever system including lever members engaging respectively the core and the periphery of the roll and a resilient connection between said lever members for applying to the former a pressure controlled by the position of the latter.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that said invention, as defined by the claims hereunto appended, may be otherwise embodied without departure from the spirit and scope thereof.

In said drawings:

Fig. 1 is a partial side elevation of a tire wrapping machine having the invention applied thereto.

Fig. 2 is an enlarged elevation of the reel and tension mechanism shown in Fig. 1.

Fig. 3 is a section taken substantially on the line 3—3, Fig. 2.

Fig. 4 is a fragmentary elevation of the roll-carrying sleeve or core.

Fig. 5 is a section taken substantially on the line 5—5, Fig. 4.

While the invention may be otherwise employed, it is shown in Fig. 1 as applied to a machine for spirally wrapping automobile tires with a helically wound strip of paper. As shown, the frame of the wrapping machine comprises a bracket 20 adapted to be secured in projecting position to the edge of a bench or table (not shown) and including a yoke portion 21 having an open top and a circular series of rollers 22, 23, 24, 25 and 26 for rotatably supporting an annular shuttle 27 formed with an opening 28 adapted to register with the open top of the yoke in order to permit insertion of the tire or other work W. Said tire W is supported with its uppermost portion centred with respect to the shuttle 27 by means of a pair of work supporting rollers one of which is shown at 29, said rollers being carried by shafts 30, journalled in suitable bearings in the frame 20 and connected by worm gearing 31 with a shaft 32 also journalled in suitable bearings in the frame and carrying the shuttle supporting roller 25. The shuttle 27 and work supporting rollers 29 are, therefore, connected for simultaneous rotation in synchronism, the arrangement being such that the work W is turned relatively slowly with respect to the speed of rotation of the shuttle 27. The rollers 25 and 26 are engaged and rotated by a friction disk 33 rotatably supported on the frame and in turn engaged and rotated by a friction pinion 34 on the shaft of an electric motor 35 having a base 36 pivoted to the frame and adapted to be raised and lowered, to engage the pinion 34 with the disk 33 and disengage the same therefrom, by means of a manually operated lever 37.

The wrapping material, preferably in the form of a continuous strip S of paper, is supplied from a roll 38 rotatably supported on the shuttle 27. From the roll 38 the strip S passes to the tire W over a folding device 39 which folds under one edge of the strip. The rotation of the roll 38 is resisted, to apply tension to the strip, by mechanism to which the present invention relates, and the preferred construction of which will now be described, reference being had particularly to Figs. 2 to 5.

Projecting from the face of the shuttle 27 is a spindle 40 on which is rotatably mounted a sleeve 41 retained on said spindle by the head of a screw 42 tapped into the end of said spindle. The sleeve 41 is formed with an integral flange 43 for fixing the position of the roll 38 which is secured to said sleeve against rotation with respect thereto by a leaf spring 44 one end of which is secured by a screw 45 within a notch 46 formed in the periphery of said sleeve.

From the foregoing it will be noted that the supporting spindle 40 and rotary sleeve 41 are connected or supported at one end only by the shuttle 27, the opposite ends being free, thereby permitting ready renewal of the roll of wrapping material. Also by virtue of this construction, the roll 38 is supported at one lateral side of the shuttle 27 and normally projects outwardly beyond the shuttle as well as inwardly thereof, as shown in dotted lines in Fig. 2, whereby a roll of relatively large size may be utilized without interfering with the rotation of the shuttle 27 around the tire to be wrapped.

Pivoted intermediate its ends at 47 to the face of the shuttle 27 is a brake lever 48 one end of which is shaped to engage the sleeve 41 between the flange 43 and the face of the shuttle 27. The other end of the brake lever 48 is connected by a spring 49 with a stud 50 projecting radially from a sleeve or hub 51 rotatably mounted on a stud 52 which projects from the face of the shuttle and is disposed parallel to the spindle 40. The sleeve 51 is provided with a radially extending arm 53, which engages the periphery of the roll 38.

It will be seen that the stud 50, sleeve 51 and arm 53 constitute, in effect, a lever of the second class pivoted at one end, engaging the roll 38 at the other, and connected intermediate its ends by the spring 49 with one arm of the lever 48. The spring 49 is so tensioned by the controlling lever 50, 51, 53, when the roll 38 is of maximum size, as to apply through the lever 48 to the sleeve 41 such a braking force resisting the rotation of the roll 38 as will cause the strip S to be drawn from the latter under the desired tension. As the diameter of the roll 38 decreases, the arm 53 of the controlling lever moves inwardly toward the axis of the roll, thereby gradually relieving the tension on the spring 49 and consequently diminishing the braking force, as is necessary in order to maintain constant the tension on the strip S as the latter is drawn from the periphery of the diminishing roll.

Having thus described my invention, I claim:

1. In a tire wrapping machine having means for supporting an article to be wrapped, the combination of a rotary shuttle rotatable around the article, a rotary member connected to said shuttle at one end only for supporting a roll of wrapping material entirely at one side of the shuttle, a pair of substantially parallel levers carried by said rotary shuttle, one comprising a brake engaging said member between the roll and the shuttle and the other engaging the periphery of the roll, and a spring connecting the levers together.

2. In a tire wrapping machine having means for supporting an article to be wrapped, the combination of a rotary shuttle rotatable around the article, a rotary member connected to said shuttle at one end only for supporting a roll of wrapping material entirely at one side of the shuttle, a pair of substantially parallel levers carried by said rotary shuttle, one comprising a one-piece brake member engaging the periphery of said member between the roll and the shuttle and the other comprising a flat member having a wiping engagement with the periphery of the roll, and a spring connecting the levers together.

3. In a tire wrapping machine having means for supporting an article to be wrapped, the combination of a shuttle rotatable around the article, a rotary member upon which the roll is mounted carried by said shuttle, an arm engaging the periphery of the roll, a stud connected with said shuttle, a hub movably mounted upon said stud by which said arm is carried, a second stud projecting laterally from said movable hub, a one-piece brake lever pivoted intermediate its ends upon the shuttle and at one end peripherally engaging said rotary member, and a spring connecting the other end of said lever with said laterally projecting stud.

4. In a tire wrapping machine having means for supporting an article to be wrapped, the combination of a shuttle rotatable around the article, a rotary member upon which the roll is mounted carried by said shuttle, an arm engaging the periphery of the roll, a hub by which said arm is carried, a stud projecting from said hub, a brake lever pivoted intermediate its ends and at one end peripherally engaging said rotary member, and a spring connecting the other end of said lever with said stud.

5. In a tire wrapping machine having means for supporting an article to be wrapped, the combination of a shuttle rotatable around the article, a rotary member upon which the roll is mounted carried by said shuttle, a controlling lever pivoted at one end to the shuttle and at the other end engaging the periphery of the roll, a brake lever pivoted intermediate its ends to the shuttle and at one end engaging said rotary member, and a spring connecting the other end of said brake lever with said controlling lever intermediate the ends of the latter.

6. In a tire wrapping machine having means for supporting an article to be wrapped, the combination of a rotary shuttle rotatable around the article, a rotary member connected to said shuttle at one end only for supporting a roll of wrapping material entirely at one side of the shuttle, a pair of levers carried by said rotary shuttle, one comprising a brake engaging said member between the roll and the shuttle and the other engaging the periphery of the roll, and a spring connecting the levers together.

In testimony whereof I affix my signature.

JASPER DERRY.